(12) United States Patent
Naftz et al.

(10) Patent No.: US 6,428,695 B1
(45) Date of Patent: Aug. 6, 2002

(54) AQUIFER REMEDIATION BARRIER FOR REMOVAL OF INORGANIC CONTAMINANTS

(75) Inventors: David L. Naftz, Park City, UT (US); James A. Davis, Menlo Park, CA (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 33 days.

(21) Appl. No.: 09/791,765

(22) Filed: Feb. 26, 2001

(51) Int. Cl.[7] .................................................. C02F 1/62
(52) U.S. Cl. ........................ 210/170; 210/747; 210/912; 405/263; 588/15; 588/17; 588/18; 588/20
(58) Field of Search ................................. 210/170, 206, 210/209, 747, 717, 723, 912, 901; 405/128, 263; 588/1, 2, 13, 15, 17, 18, 20

(56) References Cited

U.S. PATENT DOCUMENTS

| | | | | |
|---|---|---|---|---|
| 4,800,024 A | * | 1/1989 | ElPline | 210/912 |
| 5,266,213 A | * | 11/1993 | Gilham | 210/170 |
| 5,711,015 A | * | 1/1998 | Tole | 588/1 |
| 5,728,302 A | * | 3/1998 | Connor et al. | 210/747 |
| 5,783,088 A | * | 7/1998 | Amonette et al. | 210/747 |
| 5,803,174 A | * | 9/1998 | Gilmore et al. | 405/264 |
| 5,916,123 A | * | 6/1999 | Pal et al. | 588/2 |
| 5,994,608 A | * | 11/1999 | Pal et al. | 588/2 |
| 6,217,775 B1 | * | 4/2001 | Conca et al. | 210/747 |
| 2001/0054588 A1 | * | 12/2001 | Smith | 210/747 |

* cited by examiner

Primary Examiner—Christopher Upton
(74) Attorney, Agent, or Firm—Ross F. Hunt, Jr.

(57) ABSTRACT

A permeable barrier for decontaminating groundwater having two distinct components for increasing contaminant removal. Preferably, the barrier material is a mixture or distinct layers of bone-char phosphate material and iron oxide pellets. The barrier material can be incorporated as part of a shallow trenching decontamination system, or incorporated in a non-pumping well, or array of non-pumping wells, as part of a deep underground decontamination system. The system can be used for removing, among other things, a radionuclide, such as uranium, from water.

12 Claims, 3 Drawing Sheets

AQUIFER REMEDIATION BARRIER FOR REMOVAL OF INORGANIC CONTAMINANTS

FIELD OF THE INVENTION

In general, the present invention relates to the removal of inorganic contaminants from groundwater. More particularly, this invention relates to a sandwich barrier for use with either a passive treatment system employing an array of non-pumping wells or in a passive treatment trenching system for removal of such contaminants.

BACKGROUND OF THE INVENTION

As interest in environmental issues has increased, so has interest in improved methods of cleaning the land, air and water. In this regard, the interest in improved methods of groundwater cleanup has been acute. Potable ground-water supplies worldwide are contaminated by, or threatened by, advancing plumes containing radionuclides and metals. Unlike air, land and above groundwater cleanups, removal of contaminants from groundwater areas presents special problems with respect to gaining access to the contaminated areas which can make these cleanups very difficult.

Once a contaminant enters a groundwater system, it can be transported by the groundwater to a great depth. Additionally, such activities as mining or deep underground storage of radioactive or toxic materials can create a flow of contaminants through groundwater hundreds of feet below the surface. Contamination by uranium and other radioactive materials is particularly troubling because of the longevity of these materials.

Conventional methods for treating deep groundwater contamination are largely unsatisfactory because of cost and other considerations. Active methods that seek out the undergroundwater and bring it to the surface for treatment are most commonly used. The active methods most frequently used are so-called pump and treat methods, trenching methods, or some mixture of the two.

In a pumping method, contaminated groundwater is pumped from the contaminated lower regions to the upper regions where the groundwater may be treated and returned. The water may be brought up to the surface using drilled holes, trenches, or other means that provide the pumping equipment access to the water. Pump and treat systems suffer from several problems. The power requirements for a pump and treat operation are very high, and can be prohibitively expensive. This is particularly true of pump systems that treat deeper (>100 feet below land surface) groundwater. Further, these systems are costly and difficult to maintain.

A trenching system employs a trench dug into the ground down to the point of contamination. The exposed water is pumped from the trench or treated on site as the water flows through the trench area. Trenching systems work well in some instances of shallow contamination but run into difficulties when applied to contamination deeper within the ground because of the high cost of digging the trench, monitoring costs and issues of ground disturbance and recontouring. Another great disadvantages of trenching systems is the high cost of pumping the contaminated water from the trench to the surface for cleanup.

Because of the high costs of active systems using pump means, interest has increased in passive systems that can treat undergroundwater without a need for actual removal of the water. The use of arrays of non-pumped wells has been proposed as a method to remediate contaminated groundwater when the installation of treatment wells is not possible because of technical or financial constraints, for example, when contaminant streams are >200 feet below the land surface.

Prior art of interest include U.S. Pat. Nos. 5,512,702 (Methods for in-situ immobilization of lead in contaminated soils, wastes, and sediments using solid calcium phosphate materials); 5,514,279 (System for treating contaminated groundwater); and 5,362,394 (System for treating contaminated groundwater).

Important limitations of prior art treatment materials include the following: the materials are effective only with respect to a small number of contaminants, and the treatment materials are difficult to replace.

It will be evident from the foregoing that there is a need in this art of contaminated groundwater treatment for a passive, low cost materials for groundwater treatment that can treat a wide variety of underground contaminants including radioactive contaminants, can treat a large amount of water per unit, can be incorporated into a passive treatment system, and offers simple retrieval, replacement, and disposal of the reactive material used. In this regard, an alternative, cost effective approach to pump-and-treat methods could be widespread applicability to the treatment of contaminated groundwater associated with abandoned and active mine sites throughout the United States and other parts of the world.

SUMMARY OF THE INVENTION

In accordance with the invention, an improved permeable barrier is provided for decontaminating groundwater. The barrier can efficiently treat a wide variety of contaminants as part of a low-cost passive treatment system, and the barrier is simple and inexpensive to replace.

The barrier is disposed in a flow path for groundwater to be decontaminated and is comprised of a bone-char phosphate and iron oxide pellets.

In one embodiment, the phosphate and pellets of the barrier are a substantially uniform admixture.

In an alternative embodiment, the barrier comprises vertically alternating layers of the phosphate and pellets.

Preferably, the barrier is used for decontaminating a radionuclide from water. The radionulide decontaminated from water is preferably uranium.

In another aspect of the invention, a system is provided for decontaminating groundwater, the system comprising an array of non-pumping treatment wells disposed in a flow area for groundwater to be decontaminated, each of the wells containing a barrier comprised of bone-char phosphate and iron oxide pellets for decontaminating groundwater flowing therethrough.

In yet another aspect of the invention, a system is provided for decontaminating groundwater, the system comprising a trench disposed in a flow area for groundwater to be decontaminated and a barrier comprised of bone-char phosphate and iron oxide pellets disposed within the trench for decontaminating groundwater flowing therethrough.

In still another aspect of the invention, a groundwater decontamination system is provided, the system comprising a non-pumping well decontamination unit, a barrier comprised of bone-char phosphate and iron oxide pellets incorporated within the decontamination unit, and means for lowering the unit down through a non-pumping well into an acquifer containing contaminated water.

Further features and advantages of the present invention will be set forth in, or will be apparent from, the detailed description of a preferred thereof which follows.

DESCRIPTION OF A PREFERRED EMBODIMENT

Figure 1:
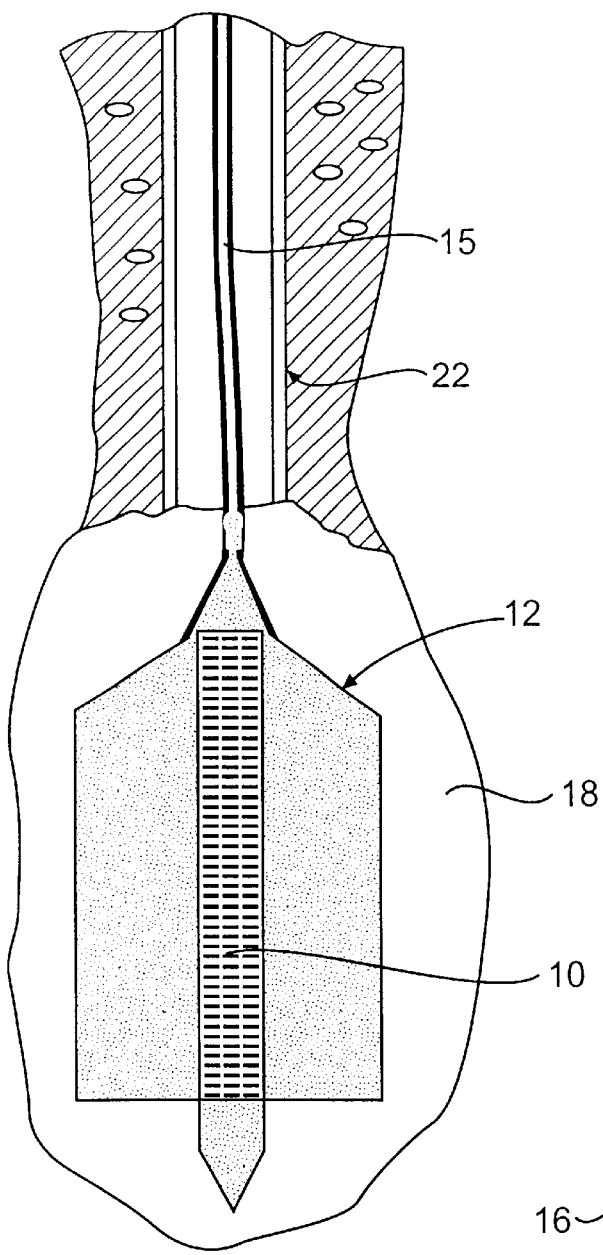
FIG. 1 is a side elevational view of the reactive barrier being deployed as part of a decontamination unit in a non-pumping well water treatment system.

Referring to the drawings and, in particular to, FIG. 1, there is shown a permeable reactive barrier 10 incorporated within a deep aquifer remediation tool (referred to by the acronym DART) for decontaminating deep groundwater. The barrier 10 is incorporated in a permanent, semi-permanent, or replaceable unit that contains a zone of reactive material that acts as a passive in-situ treatment zone.

This in-situ treatment zone degrades or immobilizes contaminants, such as radionuclides and other trace elements, as the groundwater flows therethrough. Operational and maintenance costs are lower because water flow across the barrier 10 is driven by the natural hydraulic gradient between the well and aquifer, and the treatment system does not require operational maintenance. Reactions within the barrier either degrade contaminants to non-toxic forms or transfer the contaminants to an immobile phase.

In accordance with the invention, the barrier 10 contains a barrier material comprising a mixture of iron pellets and bone char phosphate. Such a mixture increases the efficiency of removing contaminants such as uranium from groundwater. The removal of uranium by this mixture of iron and bone-char phosphate occurs because the phosphate that dissolves from the bone-char pellets is strongly adsorbed by the iron oxides in the mixture. The adsorbed phosphate on the iron source reacts with uranium in the groundwater to form a low solubility metal phosphate, hence removing the uranium from the groundwater. The barrier of the invention increases the treatment capacity and allows for longer treatment periods before material replacement. This results in a more cost effective groundwater treatment program.

Figure 3:
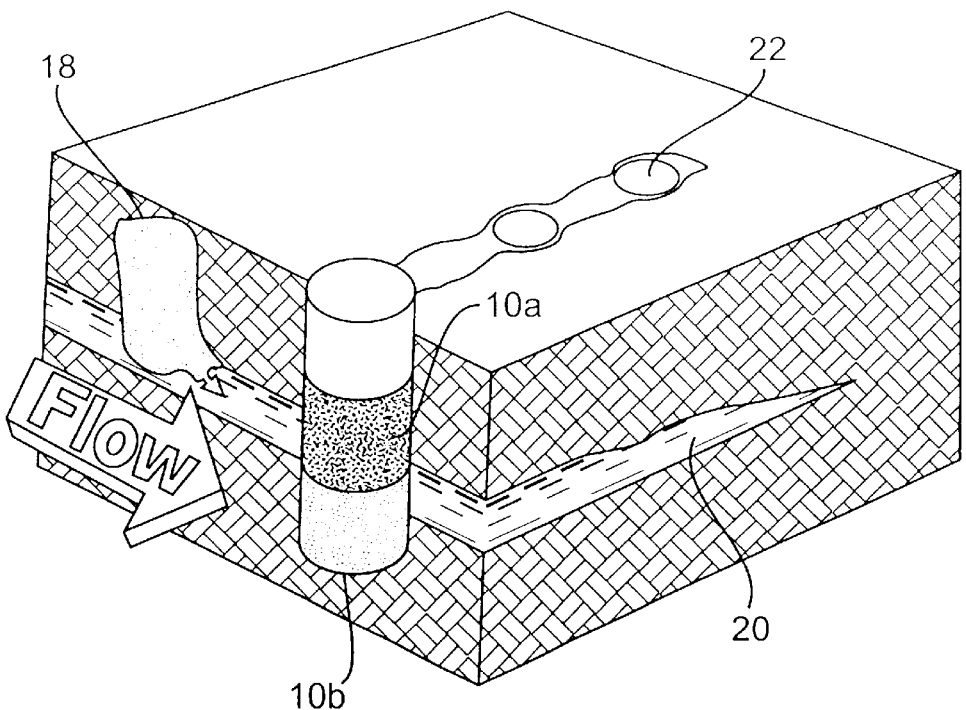
FIG. 3 is a perspective view of the barrier incorporated in an array of non-pumping decontamination wells.

In one embodiment of the invention, the overall tool or system includes a plurality of non-pumping wells, one of which is indicated at 22 in FIG. 1. In FIG. 3, three non-pumping wells 22 are located downstream of contaminant groundwater 18 which flows, as indicated by the "flow" arrow, into an acquifer 20. Referring to FIG. 1, a decontamination unit 12 is shown as being disposed in aquifer 20 having been lowered down by a cable 15 through a non-pumping well 22 into the aquifer 20 through which the contaminated groundwater flows. As water flows past the lowered unit 12, the water is passively treated by contact by the barrier 10.

Figure 2:
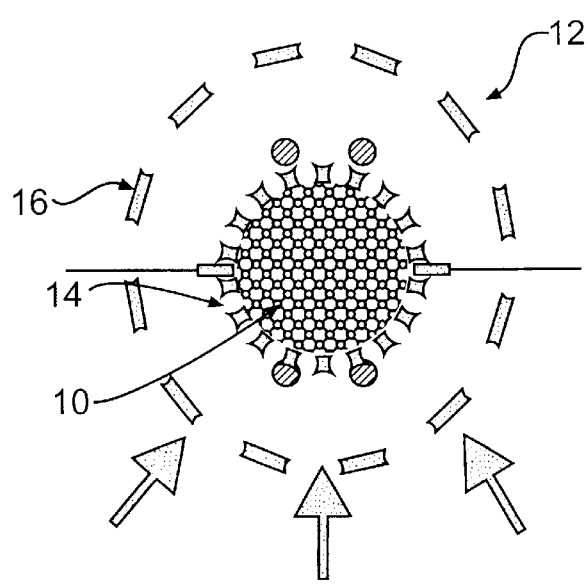
FIG. 2 is a top plan view of the reactive barrier incorporated within the decontamination unit.

Turning to FIG. 2, the decontamination unit 12 has a porous outer tube 16 with openings, and a porous inner tube 14 filled with barrier material forming barrier 10. As contaminated water 18 flows by the unit 12, a portion of the water moves into openings in the outer tube 16 to the interior of the unit 14. The water 18 comes into contact with a porous inner tube 14 that also has a plurality of openings. The water 18 moves through the openings of the inner tube 14 into the interior of the inner tube 14 and the barrier 10 therein. The water entering the inner tube 14 comes into contact with the barrier 10 which removes contaminants from inflowing water on contact. Since the barrier materials within the treatment tools can be deployed through wells, passive treatment of deeper contaminant streams (deeper than 100 feet) that could not be treated with trenching techniques is now possible.

Figure 4:
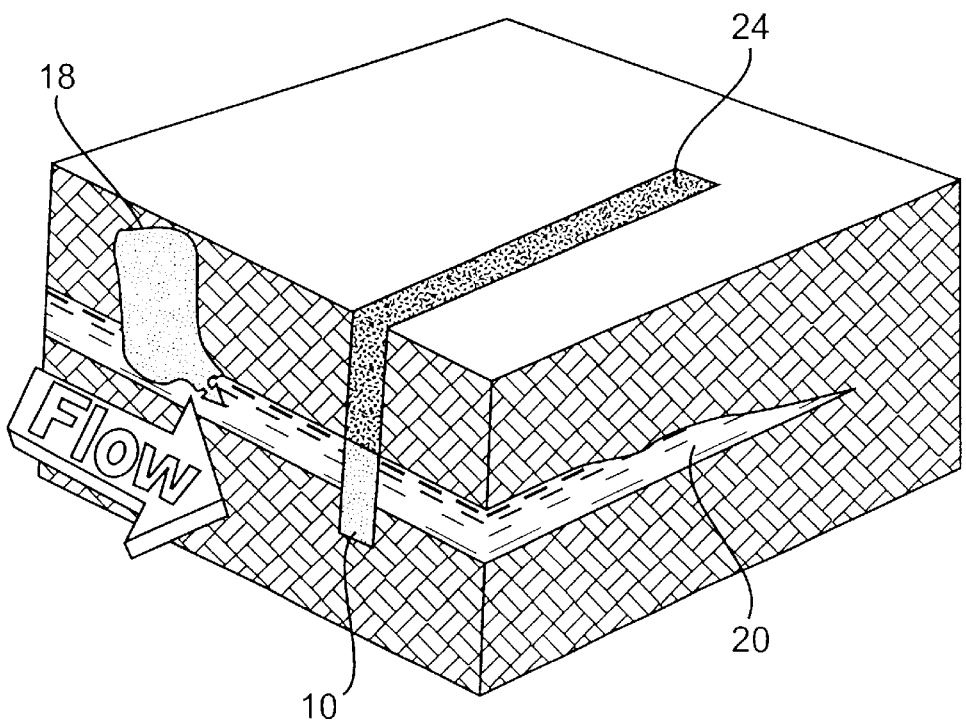
FIG. 4 is a perspective view of the barrier incorporated in a trenching system.

Referring to FIG. 4, the contaminant barrier of bone-char phosphate and iron oxide pellets can be used in other contaminant removal systems such as the trench deployment illustrated schematically in FIG. 4. The barrier 10 is located at the bottom of a trench 24 in the flow path.

The barrier can also work as part of a greater decontamination system to clean a large underground area such as a trench system or an array of non pumping wells. An array of non-pumping wells 22 are drilled at a fixed distance from eachother, or trenches are dug where needed to effect decontamination.

EXAMPLES

The barrier was tested using three barriers at an abandoned uranium upgrader. The shallow groundwater in the colluvial aquifer is contaminated with elevated concentrations of uranium that can exceed 20,000 micrograms per liter ($\mu$g/L). Two different iron sources (natural red sand and manufactured iron oxide pellets) mixed with bone char phosphate were utilized. Initial results indicate that iron oxide pellets are a superior iron source.

Installation and Operation

As shown in FIG. 3, an array of barrier deployment tubes 12 containing different proportions of bone char phosphate and foamed iron oxide pellets 10 were placed in 6-inch diameter wells 22 using a cable tool drilling rig (not shown). Use of arrays of non-pumping wells has been proposed as a method to remediate contaminated groundwater when the installation of treatment walls is not possible because of technical or financial constraints.

Under natural flow conditions at the site, groundwater converges to the non-pumping array of wells 22 and the associated barrier deployment tubes 12 in response to the difference in hydraulic conductivity between the well 22 and aquifer 20.

Numerical simulations of groundwater movement through the non-pumping well array indicate that each well intercepts groundwater in a portion of the upgradient aquifer approximately twice the inside diameter of the well.

Different proportions of bone char phosphate and iron oxide pellets were used to facilitate increased uranium removal from groundwater. The iron oxide pellets strongly adsorb the phosphate released form the phosphate pellets. The adsorbed phosphate can then react with the uranium in the groundwater to facilitate formation of insoluble uranyl phosphate compounds. The mechanism of uranium removal is a function of the type of barrier material. The $PO_4$ barrier material of pelletized bone charcoal used as a phosphate source facilitates formation of insoluble uranyl phosphate compounds.

Figure 5A:
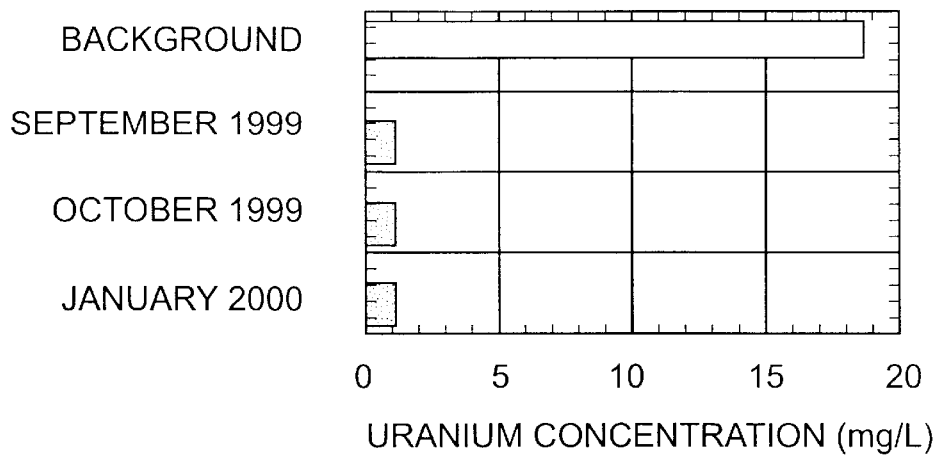
FIGS. 5a and 5b are two graphs showing the change in uranium concentrations in water samples taken along the perimeter of barrier deployment tubes in a non-pumping well treatment system in two different locations.
Figure 5B:
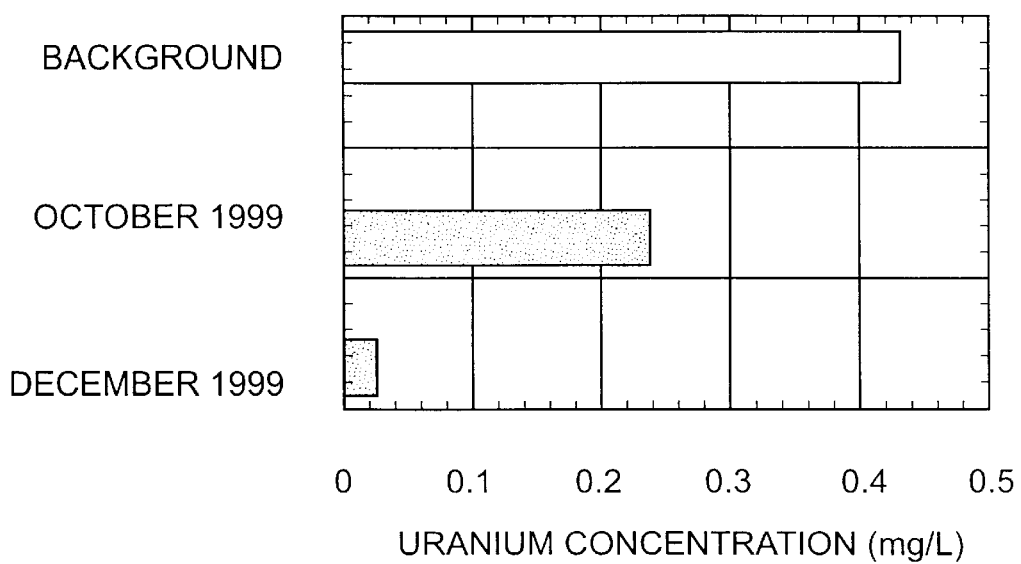

The following proportions of bone char phosphate:iron oxide pellets (volume ratio) were used in testing, the results of which are shown in FIGS. 5a and 5b: (1) 50:50 (intermixed)(FIG. 5a); and (2) 100:00 (intermixed)(FIG. 5b). Each barrier package had five monitoring points for the collection of water samples.

Results

Percent uranium removal was calculated using the following formula:

$$U_{removed} = 100 \, (U_{ban}/U_{input}) \qquad (1)$$

Where $U_{removed}$ is the percent of uranium $U_{ban}$ is the concentration of uranium in groundwater after treatment $U_{input}$ is the concentration of uranium in groundwater prior to entering the barrier.

Three months of uranium-concentration data were collected from barrier deployment tubes that were installed in the non-pumping well's. The results are as shown in FIGS. 5a and 5b. During the first three months of operation, the barrier material removed 95% of the uranium. Excellent results were also obtained using the barrier as part of a trench system (shown in FIG. 4). During the first year of operation the barrier removed an average of 94 percent of the input uranium from the groundwater after traveling 1.5 feet into the trench barrier.

Although the invention has been described above in relation to a preferred embodiment thereof, it will be understood by those skilled in the art that variations and modifications can be effected without departing from the scope and spirit of the invention.

What is claimed is:

1. A permeable barrier for decontaminating groundwater, said barrier being disposed in a flow path for groundwater to be decontaminated and said barrier comprising a bone-char phosphate and iron oxide pellets.

2. A permeable barrier for decontaminating groundwater according to claim 1, wherein said phosphate and said pellets are a substantially uniform admixture.

3. A permeable barrier for decontaminating groundwater according to claim 1, wherein said phosphate and said pellets are in vertically alternating layers.

4. A system for decontaminating groundwater comprising an array of non-pumping treatment wells disposed in a flow area for groundwater to be decontaminated, each of said wells containing a barrier comprised of bone-char phosphate and iron oxide pellets for decontaminating groundwater flowing therethrough.

5. A system for decontaminating groundwater according to claim 4, wherein said phosphate and said pellets are a substantially uniform admixture.

6. A system for decontaminating groundwater according to claim 4, wherein said phosphate and said pellets are in vertically alternating layers.

7. A system for decontaminating groundwater, comprising a trench disposed in a flow area for groundwater to be decontaminated and a barrier comprised of bone-char phosphate and iron oxide pellets disposed within said trench for decontaminating groundwater flowing therethrough.

8. A system for decontaminating groundwater according to claim 7, wherein said phosphate and said pellets are a substantially uniform admixture.

9. A system for decontaminating groundwater according to claim 7, wherein said phosphate and said pellets are in vertically alternating layers.

10. A groundwater decontamination system comprising a non-pumping well decontamination unit, a barrier comprised of bone-char phosphate and iron oxide pellets incorporated within said decontamination unit, and means for lowering said unit down through a non-pumping well into an acquifer containing contaminated water.

11. A system for decontaminating groundwater according to claim 10, wherein said phosphate and said pellets are a substantially uniform admixture.

12. A system for decontaminating groundwater according to claim 10, wherein said phosphate and said pellets are in vertically alternating layers.

* * * * *